(12) United States Patent
Ragupathi et al.

(10) Patent No.: US 10,430,251 B2
(45) Date of Patent: Oct. 1, 2019

(54) SYSTEMS AND METHODS FOR LOAD BALANCING BASED ON THERMAL PARAMETERS

(71) Applicant: Dell Products L.P., Round Rock, TX (US)

(72) Inventors: Dinesh Kunnathur Ragupathi, Round Rock, TX (US); Yogesh Prabhakar Kulkarni, Round Rock, TX (US); Balaji Bapu Gururaja Rao, Austin, TX (US); Hasnain Shabbir, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 15/155,849

(22) Filed: May 16, 2016

(65) Prior Publication Data

US 2017/0329651 A1 Nov. 16, 2017

(51) Int. Cl.
*G06F 9/50* (2006.01)
*G06F 9/48* (2006.01)
*G06F 1/20* (2006.01)

(52) U.S. Cl.
CPC ............ *G06F 9/5094* (2013.01); *G06F 1/206* (2013.01); *G06F 9/48* (2013.01); *G06F 9/4806* (2013.01); *G06F 9/4843* (2013.01); *G06F 9/4856* (2013.01); *G06F 9/4868* (2013.01); *G06F 9/4875* (2013.01); *G06F 9/4881* (2013.01); *G06F 9/4893* (2013.01); *G06F 9/50* (2013.01); *G06F 9/5005* (2013.01); *G06F 9/505* (2013.01); *G06F 9/5011* (2013.01); *G06F 9/5016* (2013.01); *G06F 9/5022* (2013.01); *G06F 9/5027* (2013.01); *G06F 9/5044* (2013.01); *G06F 9/5083* (2013.01); *G06F 9/5088* (2013.01); *Y02D 10/16* (2018.01)

(58) Field of Classification Search
CPC combination set(s) only.
See application file for complete search history.

(56) References Cited

U.S. PATENT DOCUMENTS

| | | | | |
|---|---|---|---|---|
| 8,397,088 B1* | 3/2013 | Ghose | ................... | H04L 69/329 713/300 |
| 9,557,792 B1* | 1/2017 | Potlapally | ................. | G06F 1/28 |
| 9,568,923 B1* | 2/2017 | Demetriou | ................ | G06F 1/20 |
| 2009/0292811 A1* | 11/2009 | Pienta | ..................... | G06F 1/206 709/226 |
| 2010/0235654 A1* | 9/2010 | Malik | ................... | G06F 1/3209 713/300 |

(Continued)

*Primary Examiner* — Charles M Swift
(74) *Attorney, Agent, or Firm* — Jackson Walker L.L.P.

(57) ABSTRACT

In accordance with embodiments of the present disclosure, a system may include a plurality of slots each configured to receive a modular information handling system, a plurality of air movers each configured to cool at least one modular information handling system disposed in at least one of the plurality of slots, and a controller communicatively coupled to the plurality of slots and the plurality of air movers and configured to, based on one or more thermal operational parameters associated with the plurality of slots and the plurality of air movers, determine an optimal allocation of at least one workload to a particular information handling system of a plurality of modular information handling systems received in the plurality of slots.

12 Claims, 5 Drawing Sheets

(56) References Cited

U.S. PATENT DOCUMENTS

| | | | |
|---|---|---|---|
| 2010/0313203 A1* | 12/2010 | Dawson | G06F 1/3203 718/102 |
| 2011/0093856 A1* | 4/2011 | Campbell | G06F 9/5094 718/102 |
| 2011/0238340 A1* | 9/2011 | Dasgupta | G06F 17/50 702/61 |
| 2012/0053925 A1* | 3/2012 | Geffin | H05K 7/1498 703/21 |
| 2013/0152376 A1* | 6/2013 | Corddry | H05K 7/20836 29/592.1 |
| 2014/0298349 A1* | 10/2014 | Jackson | G06Q 50/06 718/104 |
| 2015/0256433 A1* | 9/2015 | Sum | G01R 25/00 709/224 |
| 2015/0261577 A1* | 9/2015 | Gilbert | G06F 9/5044 718/1 |
| 2016/0117199 A1* | 4/2016 | Sundaram | G06F 1/206 718/104 |
| 2017/0013049 A1* | 1/2017 | Patil | H04L 67/1002 |

\* cited by examiner

| NORMALIZED PROCESSOR LOAD (%) | AIR MOVER SPEED (RPM) |
|---|---|
| 0-9 | 100 |
| 10-19 | 200 |
| 20-29 | 350 |
| 30-39 | 600 |
| 40-49 | 900 |
| 50-59 | 1200 |
| 60-64 | 1600 |
| 65-69 | 2000 |
| 70-74 | 2500 |
| 75-79 | 3000 |
| 80-84 | 3600 |
| 85-89 | 4200 |
| 90-92 | 4500 |
| 93-96 | 5000 |
| 97-100 | 6000 |

700

| ZONE | INFORMATION HANDLING SYSTEM | NORMALIZED PROCESSOR LOAD (%) | AVERAGE NORMALIZED PROCESSOR LOAD (%) |
|---|---|---|---|
| 1 | 1-1 | 20 | 22.67 |
| 1 | 1-2 | 30 | 22.67 |
| 1 | 1-3 | 18 | 22.67 |
| 2 | 2-1 | 45 | 48.33 |
| 2 | 2-2 | 40 | 48.33 |
| 2 | 2-3 | 60 | 48.33 |
| 3 | 3-1 | 59 | 64.33 |
| 3 | 3-2 | 71 | 64.33 |
| 3 | 3-3 | 63 | 64.33 |
| 4 | 4-1 | 69 | 69.67 |
| 4 | 4-2 | 70 | 69.67 |
| 4 | 4-3 | 69 | 69.67 |

FIG. 7

SYSTEMS AND METHODS FOR LOAD BALANCING BASED ON THERMAL PARAMETERS

TECHNICAL FIELD

The present disclosure relates in general to information handling systems, and more particularly to placement of a workload on an information handling system within a modular chassis based on thermal parameters associated with the modular chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

Information handling systems may often be employed in servers, including server architectures with multiple information handling systems with various peripheral and input/output (I/O) capabilities common to the chassis. Implementation of such a server chassis with slots for multiple information handling systems may present challenges, including populating the chassis with information handling systems in a manner that provides the necessary cooling by air movers, while reducing the amount of power consumed by the air movers, and allocating workloads to information handling systems in a manner that provides the necessary cooling by air movers, while reducing the amount of power consumed by the air movers.

SUMMARY

In accordance with the teachings of the present disclosure, disadvantages and problems associated with thermal control of an information handling system server chassis may be reduced or eliminated.

In accordance with embodiments of the present disclosure, a system may include a plurality of slots each configured to receive a modular information handling system, a plurality of air movers each configured to cool at least one modular information handling system disposed in at least one of the plurality of slots, and a controller communicatively coupled to the plurality of slots and the plurality of air movers and configured to, based on one or more thermal operational parameters associated with the plurality of slots and the plurality of air movers, determine an optimal allocation of at least one workload to a particular information handling system of a plurality of modular information handling systems received in the plurality of slots.

In accordance with these and other embodiments of the present disclosure, a method may include receiving information regarding one or more thermal operational parameters associated with a plurality of slots each configured to receive a modular information handling system and a plurality of air movers each configured to cool at least one modular information handling system disposed in at least one of the plurality of slots and determining an optimal allocation of at least one workload to a particular information handling system of a plurality of modular information handling systems received in the plurality of slots.

In accordance with these and other embodiments of the present disclosure, an article of manufacture may include a non-transitory computer-readable medium and computer-executable instructions carried on the computer readable medium, the instructions readable by a processor, the instructions, when read and executed, for causing the processor to receive information regarding one or more thermal operational parameters associated with a plurality of slots each configured to receive a modular information handling system and a plurality of air movers each configured to cool at least one modular information handling system disposed in at least one of the plurality of slots and determine an optimal allocation of at least one workload to a particular information handling system of a plurality of modular information handling systems received in the plurality of slots.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 7 depicts an example workload assignment table, in accordance with embodiments of the present disclosure.

DETAILED DESCRIPTION

Preferred embodiments and their advantages are best understood by reference to FIGS. 1 through 7, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

Figure 1:
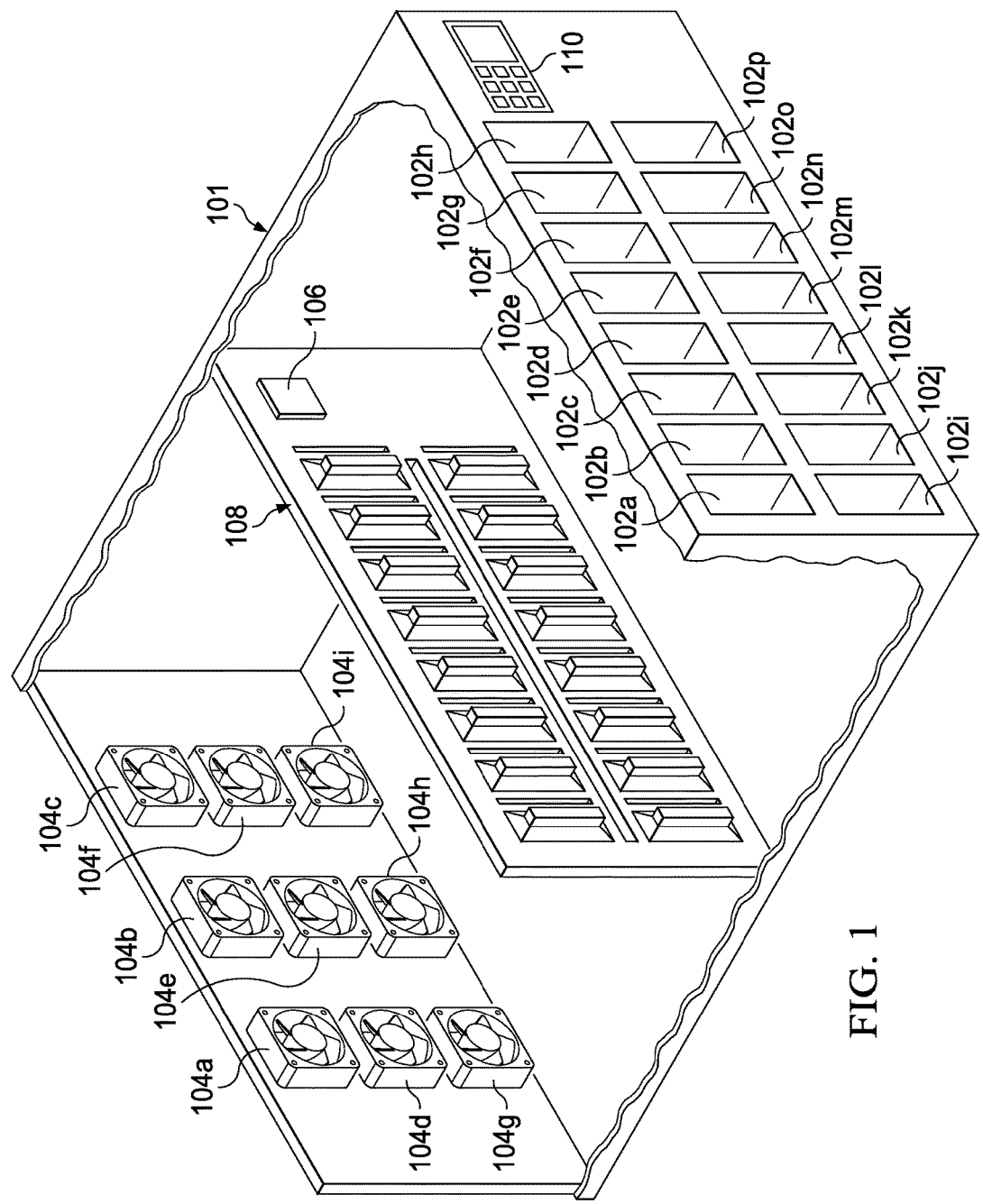
FIG. 1 illustrates a diagram of an example system chassis configured to receive multiple modular information handling systems, in accordance with embodiments of the present disclosure.

FIG. 1 illustrates a diagram of an example system 100 having a chassis 101 with a plurality of slots 102a-p (sometimes referred to individually as a slot 102 or in plural as slots 102) electrically and mechanically coupled to a midplane 108, wherein each slot 102 may be configured to receive a modular information handling system (e.g., a server). Although FIG. 1 depicts chassis 101 as having 16 slots 102, chassis 101 may include any suitable number of slots 102. As depicted in FIG. 1, chassis 101 may also include a chassis controller 106 electrically and mechanically coupled to midplane 108, a plurality of air movers 104a-104i (sometimes referred to individually as an air mover 104 or in plural as air movers 104) communicatively coupled to chassis controller 106, and a user interface 110 communicatively coupled to chassis controller 106.

An air mover 104 may be communicatively coupled to chassis controller 106, and may include any mechanical or electro-mechanical system, apparatus, or device operable to move air and/or other gases. In some embodiments, an air mover 104 may comprise a fan (e.g., a rotating arrangement of vanes or blades which act on the air). In other embodiments, an air mover 104 may comprise a blower (e.g., a centrifugal fan that employs rotating impellers to accelerate air received at its intake and change the direction of the airflow). In these and other embodiments, rotating and other moving components of an air mover 104 may be driven by a motor. The rotational speed of such motor may be controlled by one or more control signals communicated from chassis controller 106. In operation, an air mover 104 may cool information handling systems and information handling resources of chassis 101 by drawing cool air into chassis 101 from the outside chassis 101, expel warm air from inside chassis 101 to the outside of chassis 101, and/or move air across one or more heatsinks (not explicitly shown) internal to chassis 101 to cool one or more information handling systems and/or information handling resources. Although FIG. 1 depicts chassis 101 as having nine air movers 104, chassis 101 may include any suitable number of air movers 104.

Chassis controller 106 may be any system, device, or apparatus configured to facilitate management and/or control of system 100, information handling systems received in slots 102, and/or one or more of its component information handling resources. Chassis controller 106 may be configured to issue commands and/or other signals to manage and/or control information handling systems and/or information handling resources of system 100. Chassis controller 106 may comprise a microprocessor, microcontroller, DSP, ASIC, field programmable gate array ("FPGA"), EEPROM, or any combination thereof. As shown in FIG. 1, chassis controller 106 may be coupled to mid-plane 106. In some embodiments, a chassis controller 106 may provide a user interface and high level controls for management of switches, including configuring assignments of individual information handling systems 102 to non-shared information handling resources of system 100. In these and other embodiments, a chassis controller 106 may define configurations of the storage subsystem of system 100. For example, a chassis controller 106 may provide physical function configuration and status information that would normally occur at the driver level in traditional server implementations. Examples of physical functions include disk drive discovery and status, RAID configuration, and logical volume mapping.

In addition or alternatively, chassis controller 106 may also provide a management console for user/administrator access to these functions. For example, a chassis management controller 106 may implement Web Services Management ("WS-MAN") or another suitable management protocol permitting a user to remotely access a chassis controller 106 to configure system 100 and its various information handling resources. In such embodiments, a chassis controller 106 may interface with a network interface separate from an "in-band" network interface of information handling systems received in slots 102, thus allowing for "out-of-band" control of system 100, such that communications to and from chassis controller 106 are communicated via a management channel physically isolated from an "in band" communication channel. Thus, for example, if a failure occurs in system 100 that prevents an administrator from interfacing with system 100 via an in-band communication pathway (e.g., operating system failure, power failure, etc.), the administrator may still be able to monitor and/or manage system 100 (e.g., to diagnose problems that may have caused failure) via a chassis controller 106. In the same or alternative embodiments, chassis controller 106 may allow an administrator to remotely manage one or more parameters associated with operation of system 100 and its various information handling resources (e.g., power usage, processor allocation, memory allocation, security privileges, etc.). A chassis controller 106 may also be known as a chassis management controller or a satellite controller.

Midplane 108 may comprise any system, device, or apparatus configured to interconnect information handling resources of chassis 101 with each other. Accordingly, midplane 108 may include slots, pads, and/or other connectors configured to receive corresponding electrical connectors of information handling resources in order to electrically couple information handling systems disposed in slots 102 and/or information handling resources to each other.

User interface 110 may include any system, apparatus, or device via which a user may interact with chassis 101 and its various components by facilitating input from a user allowing the user to manipulate chassis 101 and output to a user allowing chassis 101 to indicate effects of the user's manipulation. For example, user interface 110 may include a display suitable for creating graphic images and/or alphanumeric characters recognizable to a user, and may include, for example, a liquid crystal display, a cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 110 may include other user interface elements (e.g., a keypad, buttons, and/or switches placed in proximity to a display) allowing a user to provide input to chassis 101. User interface 110 may be coupled to chassis controller 106 and/or other components of chassis 101, and thus may allow a user to configure various information handling systems and/or information handling resources of chassis 101.

In addition to slots 102, air movers 104, chassis controller 106, midplane 108, and use interface 110, chassis 101 may include one or more other information handling resources.

In operation, chassis controller 106 may, based on identities of slots 102 populated with information handling systems and one or more characteristics of individual information handling systems populating the slots (e.g., airflow impedance, requested airflow, etc.), determine a power-efficient placement of a workload on a particular information handling system received in chassis 101 within various slots 102, as described in greater detail elsewhere in this disclosure.

Figure 2:
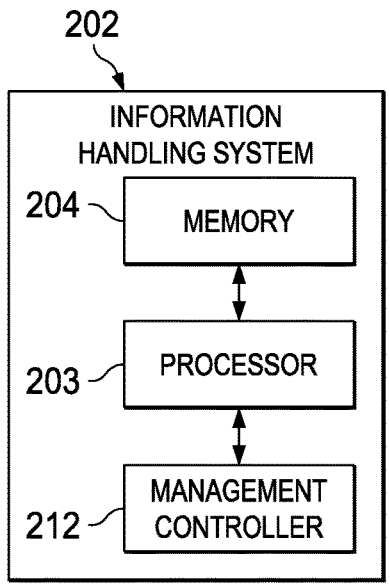
FIG. 2 illustrates a block diagram of an example modular information handling system, in accordance with embodiments of the present disclosure.

FIG. 2 illustrates a block diagram of an example modular information handling system 202 that may be received in a slot 102 of chassis 101, in accordance with embodiments of the present disclosure. In some embodiments, information handling system 102 may comprise a server or "blade." As shown in FIG. 2, information handling system 202 may comprise a processor 203, a memory 204, and a management controller 212.

Processor 203 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 203 may interpret and/or execute program instructions and/or process data stored in memory 204 and/or another component of information handling system 202.

Memory 204 may be communicatively coupled to processor 203 and may comprise any system, device, or apparatus operable to retain program instructions or data for a period of time. Memory 204 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. Management controller 212 may comprise any system, device, or apparatus configured to facilitate management and/or control of information handling system 202 and/or one or more of its component information handling resources. Management controller 212 may be configured to issue commands and/or other signals to manage and/or control information handling system 202 and/or its information handling resources. Management controller 212 may comprise a microprocessor, microcontroller, DSP, ASIC, field programmable gate array ("FPGA"), EEPROM, or any combination thereof. Management controller 212 also may be configured to provide out-of-band management facilities for management of information handling system 202. Such management may be made by management controller 212 even if information handling system 202 is powered off or powered to a standby state. In certain embodiments, management controller 212 may include or may be an integral part of a baseboard management controller (BMC), a remote access controller (e.g., a Dell Remote Access Controller or Integrated Dell Remote Access Controller), or an enclosure controller.

In addition to processor 203, memory 204, and management controller 212, information handling system 202 may include one or more other information handling resources.

Figure 3:
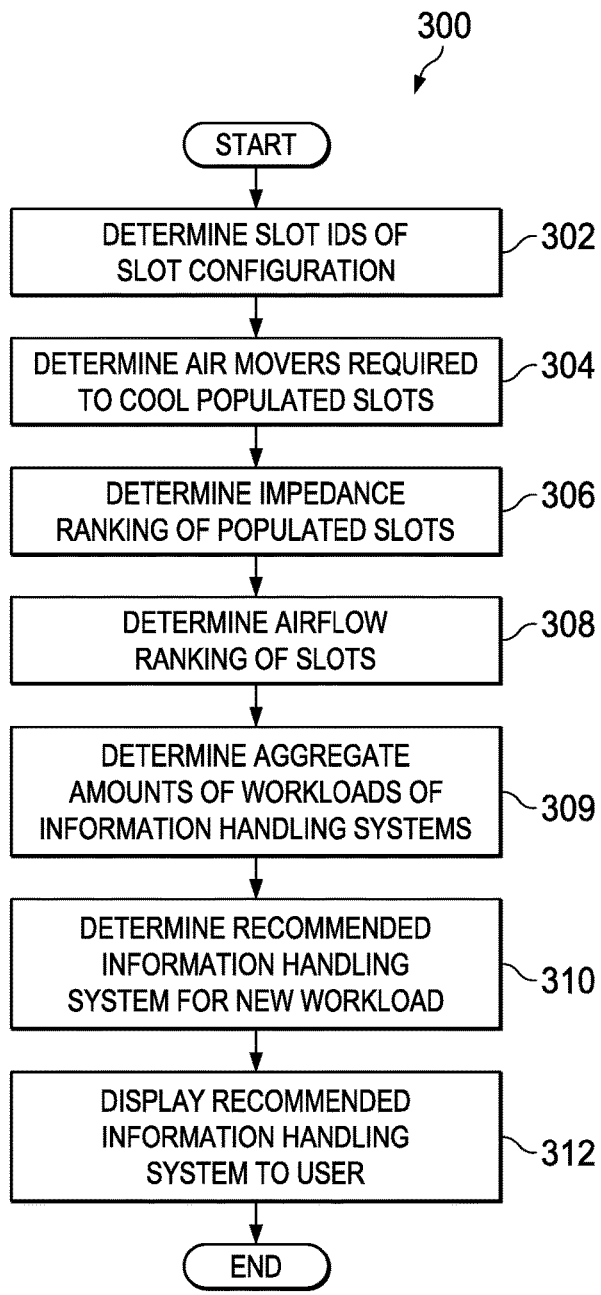
FIG. 3 illustrates a flow chart of an example method for recommending, in real-time, placement of a workload on an information handling system, in accordance with embodiments of the present disclosure.

FIG. 3 illustrates a flow chart of an example method 300 for recommending, in real-time, placement of a workload on an information handling system, in accordance with embodiments of the present disclosure. According to one embodiment, method 300 may begin at step 302. As noted above, teachings of the present disclosure may be implemented in a variety of configurations of chassis 101. As such, the preferred initialization point for method 300 and the order of the steps comprising method 300 may depend on the implementation chosen.

As used herein, a "workload" may refer to a task of executable instructions, or a collection of tasks of executable instructions, which may be executed on a processor 203 of an information handling system 202, and which may utilize or require one or more information handling resources (e.g., processor 203, memory 204, etc.) to fully process the workload. Accordingly, execution of a workload may cause a processor 203, a memory 204, and/or one or more other information handling resources of an information handling system 202 to generate heat which may in turn require cooling by one or more air movers 104.

At step 302, chassis controller 106 may determine the identities of slots 102 populated with information handling systems 202. At step 304, chassis controller 106 may determine which air movers 104 are required to cool information handling systems in the populated slots. In some embodiments, chassis controller 106 may maintain a table, database, map, list, or other data structure which associates particular slots 102 to corresponding air movers 104. An example of such data structure is set forth in FIG. 4, in which various zones of slots 102 are defined, and the air movers 104 required to cool information handling systems disposed in slots within the various zones are also defined. Thus, if one or more slots 102 in a particular zone are populated, chassis controller 106 or another component of chassis 101 will cause the air movers assigned to such zone to operate and cool the information handling systems populated in the zone.

At step 306, chassis controller 106 may determine an impedance ranking of each information handling system populating a slot 102, such that the higher an impedance ranking for an information handling system, the more airflow the information handling system requires. In some embodiments, such impedance ranking may be determined from reading thermal tables associated with the information handling systems, which may take into account thermal requirements of various information handling resources, including numbers and/or types of processors, memories, storage controllers, and/or other information handling resources.

At step 308, chassis controller 106 may determine an airflow ranking for each of the populated slots 102, wherein the higher the airflow ranking for a slot 102, the greater the airflow to the slot 102. Such airflow ranking of a particular slot 102 may be based on a physical structure of such slot 102, physical characteristics of an information handling system disposed in such slot 102, physical structures of chassis 101 impeding flow of air from air movers 104 to the particular slot (e.g., midplane 108, etc.), and/or other characteristics of chassis 101. In some embodiments, airflow ranking for various slots 102 may be determined based on laboratory testing and characterization of chassis 101 or chasses similar thereto prior to delivery of chassis 101 to an intended end user. In some embodiments, airflow and impedance of a slot may be correlated (e.g., inversely proportional to one another), such that steps 306 and 308 may be combined into a single step.

At step 309, chassis controller 106 may determine an aggregate amount of workloads of each information handling system 202 populated in a respective slot 102. Such aggregate amount of workloads may be indicative of the cooling requirements of an information handling system.

At step 310, chassis controller 106 may determine, for a new workload, a recommended information handling system 202 to which the new workload should be allocated in order to minimize power consumption of air movers 104. Such determination may be made based on at least one of identities of slots 102 populated with modular information handling systems 202, an airflow ranking of the plurality of slots 102, an impedance ranking of information handling systems 202 disposed in the slots, the aggregate amount of workloads of each information handling system 202 populated in respective slots 102, and an expected amount of heat to be generated by the new workload. At step 312, based on some or all of the information collected in steps 302 through 310, chassis controller 106 may display to a user (e.g., via user interface 110 or another user interface) a recommended modular information handling system 202 in which to allocate the new workload. After completion of step 312, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using chassis controller 106 or any other system operable to implement method 300. In certain embodiments, method 300 may be implemented partially or fully in software and/or firmware embodied in computer-readable media.

In addition to or in lieu of the above functionality, chassis controller 106 may also cause migration of workloads between information handling systems 102 based on air mover importance rankings of air movers 104. As used herein, an air mover importance ranking may indicate a relative amount of heat-generating components a particular air mover 104 may be responsible for cooling. For example, in a chassis 101 fully populated with information handling systems 102, and assuming the cooling of each information handling system 102 is given equal importance, air movers 104a, 104c, 104d, 104f, 104g, and 104i may have higher importance than other air movers because each such air mover 104a, 104c, 104d, 104f, 104g, and 104i contributes to the cooling of two zones while other air movers 104 contribute to cooling only one zone. More detailed examples of air mover importance rankings in which heat-generating components may be given different priorities or weights is set forth in U.S. patent application Ser. No. 14/575,845 filed Dec. 18, 2014, and which is incorporated herein by reference.

Figures 4, 5:
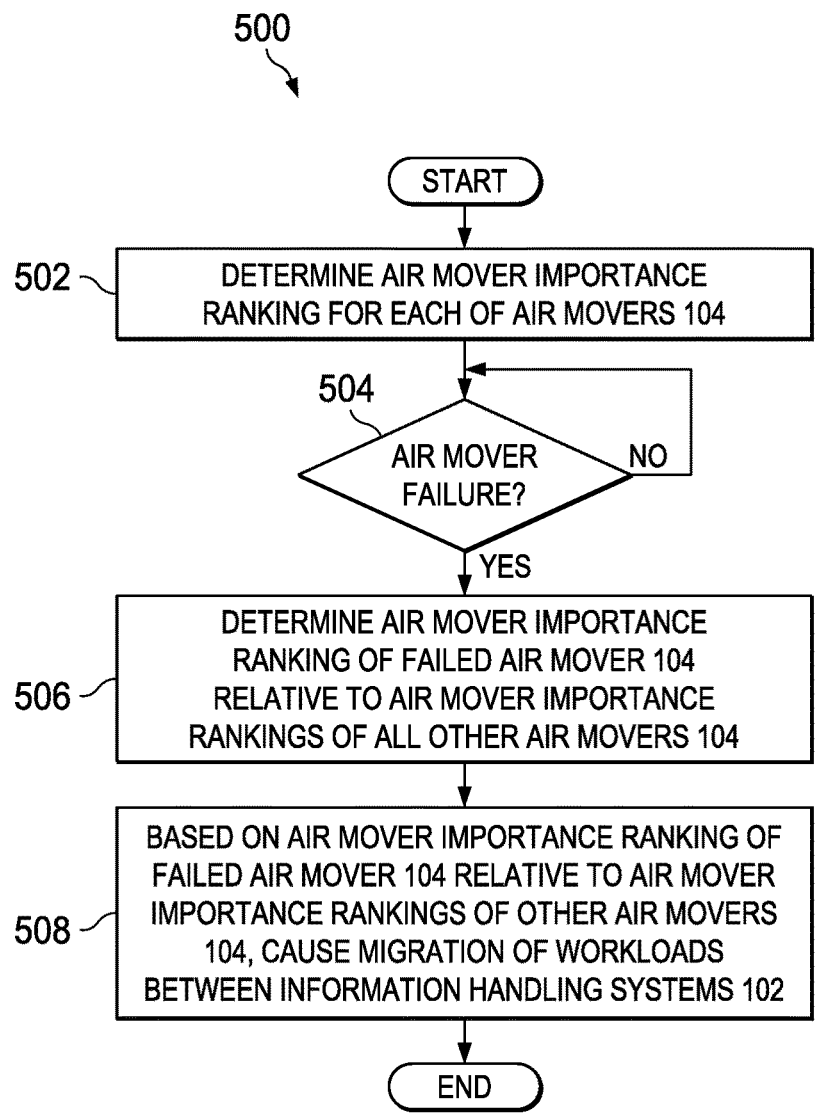
FIG. 4 illustrates an example table defining zones whereby particular air movers within the chassis depicted in FIG. 1 are associated with particular slots within the chassis, in accordance with embodiments of the present disclosure.
FIG. 5 illustrates a flow chart of an example method for migrating workloads based on air mover failure, in accordance with embodiments of the present disclosure.

FIG. 5 illustrates a flow chart of an example method 500 for migrating workloads based on air mover failure, in accordance with embodiments of the present disclosure. According to one embodiment, method 500 may begin at step 502. As noted above, teachings of the present disclosure may be implemented in a variety of configurations of chassis 101. As such, the preferred initialization point for method 500 and the order of the steps comprising method 500 may depend on the implementation chosen.

At step 502, chassis controller 106 may determine an air mover importance ranking for each of air movers 104 based on a number and/or types of heat-generating components of chassis 101 for which such air mover 104 is responsible for cooling. At step 504, chassis controller 106 may determine if any air mover failure has occurred. If an air mover failure occurs, method 500 may proceed to step 506. Otherwise, method 500 may remain at step 504 until an air mover failure has occurred.

At step 506, in response to an air mover failure, chassis controller 106 may determine the air mover importance ranking of the failed air mover 104 relative to the air mover importance rankings of all other air movers 104. At step 508, based on the air mover importance ranking of the failed air mover 104 relative to the air mover importance rankings of all other air movers 104, chassis controller 106 may cause migration of workloads between information handling systems 202. As an example, if an air mover 104 with a relatively high air mover importance ranking fails, chassis controller 106 may cause one or more workloads on information handling systems 202 affected by the failure of the air mover 104 (e.g., within a zone of the failed air mover 104) to be migrated to one or more other information handling systems 202 not affected by the failure of the air mover 104. As another example, if an air mover 104 with a relatively high air mover importance ranking fails, chassis controller 106 may cause one or more higher power-consuming workloads on information handling systems 202 affected by the failure of the air mover 104 to be migrated to one or more other information handling systems 202 not affected by the failure of the air mover 104, and cause one or more lower power-consuming workloads on information handling systems 202 not affected by the failure of the air mover 104 to be migrated to one or more other information handling systems 202 affected by the failure of the air mover 104. On the other hand, if an air mover 104 with a relatively low air mover importance ranking fails, chassis controller 106 may not cause migration of any workloads.

In some embodiments, chassis controller 106 may cause migration of workloads immediately in response to air mover failure as described above. In other embodiments, chassis controller 106 may, in the event of an air mover failure, cause migration of workloads in response to a subsequent thermal condition occurring after such failure, such as sensed temperature associated with an affected information handling system 202 exceeding a threshold temperature, for example.

Chassis controller 106 may cause migration of workloads in any suitable manner. For example, chassis controller 106 may be communicatively coupled to management controllers 212 of information handling systems 202, and may communicate a command for migration of one or more workloads. In response, a management controller 212 may interact with an operating system or hypervisor executing on an information handling system 202 to migrate a virtual machine, application, and/or other workload from such information handling system 202 to another information handling system 202.

After completion of step 508, method 500 may end. In some embodiments, after completion of step 508, method 500 may proceed again to step 502.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order.

Method 500 may be implemented using chassis controller 106 or any other system operable to implement method 500. In certain embodiments, method 500 may be implemented partially or fully in software and/or firmware embodied in computer-readable media.

In addition to the functionality described above, chassis controller 106 may, based on existing workloads of processors 203 of information handling systems 202, determine a power-efficient placement of a new workload so as to minimize increase in power consumption of air movers 104 in response to the new workload, as described in greater detail elsewhere in this disclosure. To accomplish such functionality, chassis controller 106 may obtain two tables, either or both of which may be stored in computer-readable media integral to or otherwise accessible to chassis controller 106. Such tables may comprise an air mover speed stepping table and a workload assignment table.

Figure 6:
FIG. 6 depicts an example air mover speed stepping table, in accordance with embodiments of the present disclosure.

FIG. 6 depicts an example air mover speed stepping table 600, in accordance with embodiments of the present disclosure. As shown in FIG. 6, air mover speed stepping table 600 may include a plurality of entries, each entry correlating an average normalized processor load for a zone of information handling systems 202 to an air mover speed for air movers 104 of such zone.

FIG. 7 depicts an example workload assignment table 700, in accordance with embodiments of the present disclosure. As shown in FIG. 7, workload assignment table 700 may indicate for each zone of information handling systems 202 the identities of information handling systems 202 in such zone, the normalized processor load for each information handling system 202 in such zone, and the average normalized processor load for the zone.

In operation, to allocate a new workload, chassis controller 106 may assign the new workload to the zone in which the addition of such new workload has a minimal effect with respect to increasing power consumption by air movers 104. For example, in reference to workload assignment table 700, if a new workload that would contribute 18% to an overall processor workload is to be allocated, chassis controller 106 may select zone 1, as the allocation of the workload to zone 1 would not push the average normalized processor load for zone 1 into another range of values of air mover speed stepping table 600. In other words, if the new workload is allocated to zone 1, air mover speeds remain the same, whereas if added to any other zone, air mover speeds would increase, thus increasing power consumed by air movers 104.

Once a zone is selected for allocation of a new workload, chassis controller 106 may allocate the workload to the information handling system 202 of the zone which has the lowest normalized processor load.

In other embodiments, chassis controller 106 may allocate a new workload based on parameters other than processor loads. For example, in some embodiments, chassis controller 106 may allocate a new workload to an information handling system 202 disposed in a slot 102 which has a fewer number of air movers 104 mapped to such slot 102 as compared to other slots. For example, because slots 102a, 102h, 102i, and 102p have fewer air movers mapped to such slots 102 (see FIG. 4), priority may be given to allocating workloads to information handling systems 202 received in such slots 102a, 102h, 102i, and 102p over other slots, as increasing workload in such slots 102 may not require as great of an increase in air mover speed.

Although the present disclosure has been described in detail, it should be understood that various changes, substitutions, and alterations can be made hereto without departing from the spirit and the scope of the disclosure as defined by the appended claims.

What is claimed is:

1. A system comprising:
   a plurality of slots each configured to receive a modular information handling system;
   a plurality of air movers each configured to cool at least one modular information handling system disposed in at least one of the plurality of slots; and
   a controller communicatively coupled to the plurality of slots and the plurality of air movers and configured to, based on one or more thermal operational parameters associated with the plurality of slots and the plurality of air movers, determine an optimal allocation of at least one workload to a particular information handling system of a plurality of modular information handling systems received in the plurality of slots, wherein the determining the optimal allocation includes:
determining, for each of a plurality of possible allocations, a corresponding power consumption associated with the plurality of air movers; and
selecting the optimal allocation from the plurality of possible allocations such that the corresponding power consumption associated with the plurality of air movers is minimized;
wherein the optimal allocation is further based on an airflow impedance ranking of the plurality of modular information handling systems received in the plurality of slots, wherein the airflow impedance of each respective modular information handling system is based on an amount of airflow impeded by respective numbers and types of information handling resources contained in such respective modular information handling system.

2. The system of claim 1, wherein the controller is configured to determine the optimal allocation further based on at least one of: identities of slots populated with modular information handling systems, an airflow ranking of the plurality of slots, an aggregate amount of workloads of information handling systems disposed in the slots, and a new workload to be allocated to one of the information handling systems disposed in the slots.

3. The system of claim 1, wherein the controller is configured to determine the optimal allocation in response to a failure of at least one of the plurality of air movers and based on an air mover importance ranking of the failed air mover relative to the others of the plurality of air movers.

4. The system of claim 1, wherein the controller is configured to determine the optimal allocation further based on a number of the plurality of air movers.

5. A method comprising:
receiving information regarding one or more thermal operational parameters associated with a plurality of slots each configured to receive a modular information handling system and a plurality of air movers each configured to cool at least one modular information handling system disposed in at least one of the plurality of slots; and
determining an optimal allocation of at least one workload to a particular information handling system of a plurality of modular information handling systems received in the plurality of slots, wherein the determining the optimal allocation includes:
determining, for each of a plurality of possible allocations, a corresponding power consumption associated with the plurality of air movers; and
selecting the optimal allocation from the plurality of possible allocations such that the corresponding power consumption associated with the plurality of air movers is minimized;
wherein the optimal allocation is further based on an airflow impedance ranking of the plurality of modular information handling systems received in the plurality of slots, wherein the airflow impedance of each respective modular information handling system is based on an amount of airflow impeded by respective numbers and types of information handling resources contained in such respective modular information handling system.

6. The method of claim 5, further comprising determining the optimal allocation based on at least one of: identities of slots populated with modular information handling systems, an airflow ranking of the plurality of slots, an aggregate amount of workloads of information handling systems disposed in the slots, and a new workload to be allocated to one of the information handling systems disposed in the slots.

7. The method of claim 5, further comprising determining the optimal allocation in response to a failure of at least one of the plurality of air movers and based on an air mover importance ranking of the failed air mover relative to the others of the plurality of air movers.

8. The method of claim 5, further comprising determining the optimal allocation based on a number of the plurality of air movers.

9. An article of manufacture comprising:
a non-transitory computer-readable medium; and
computer-executable instructions carried on the computer-readable medium, the instructions readable by a processor, the instructions, when read and executed, for causing the processor to:
receive information regarding one or more thermal operational parameters associated with a plurality of slots each configured to receive a modular information handling system and a plurality of air movers each configured to cool at least one modular information handling system disposed in at least one of the plurality of slots; and
determine an optimal allocation of at least one workload to a particular information handling system of a plurality of modular information handling systems received in the plurality of slots, wherein the determining the optimal allocation includes:
determining, for each of a plurality of possible allocations, a corresponding power consumption associated with the plurality of air movers; and
selecting the optimal allocation from the plurality of possible allocations such that the corresponding power consumption associated with the plurality of air movers is minimized;
wherein the optimal allocation is further based on an airflow impedance ranking of the plurality of modular information handling systems received in the plurality of slots, wherein the airflow impedance of each respective modular information handling system is based on an amount of airflow impeded by respective numbers and types of information handling resources contained in such respective modular information handling system.

10. The article of claim 9, the instructions for further causing the processor to determine the optimal allocation based on at least one of: identities of slots populated with modular information handling systems, an airflow ranking of the plurality of slots, an aggregate amount of workloads of information handling systems disposed in the slots, and a new workload to be allocated to one of the information handling systems disposed in the slots.

11. The article of claim 9, the instructions for further causing the processor to determine the optimal allocation in response to a failure of at least one of the plurality of air movers and based on an air mover importance ranking of the failed air mover relative to the others of the plurality of air movers.

12. The article of claim 9, the instructions for further causing the processor to determine the optimal allocation based on a number of the plurality of air movers.

* * * * *